(12) United States Patent
Shome et al.

(10) Patent No.: US 9,145,198 B1
(45) Date of Patent: Sep. 29, 2015

(54) VARIABLE CAMBER AIRFOIL SYSTEM

(71) Applicant: The Boeing Company, Chicago, IL (US)

(72) Inventors: Moushumi Shome, Kent, WA (US); Frederick T. Calkins, Renton, WA (US); Sahrudine Apdalhaliem, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 460 days.

(21) Appl. No.: 13/734,421

(22) Filed: Jan. 4, 2013

(51) Int. Cl.
*B64C 3/48* (2006.01)
*B64C 3/14* (2006.01)

(52) U.S. Cl.
CPC ... *B64C 3/48* (2013.01); *B64C 3/14* (2013.01); *B64C 2003/142* (2013.01)

(58) Field of Classification Search
CPC ...... B64C 2003/445; B64C 3/48; B64C 3/44; Y02T 50/145
USPC ................................ 244/219, 46, 45 R, 99.8
See application file for complete search history.

(56) References Cited

U.S. PATENT DOCUMENTS

| | | | | |
|---|---|---|---|---|
| 5,114,104 A | * | 5/1992 | Cincotta et al. | 244/219 |
| 5,167,387 A | * | 12/1992 | Hartwich | 244/200 |
| 5,224,826 A | * | 7/1993 | Hall et al. | 416/4 |
| 5,662,294 A | * | 9/1997 | Maclean et al. | 244/219 |
| 5,752,672 A | * | 5/1998 | McKillip, Jr. | 244/99.8 |
| 6,182,929 B1 | * | 2/2001 | Martin et al. | 244/219 |
| 6,588,709 B1 | * | 7/2003 | Dunne et al. | 244/201 |
| 6,979,050 B2 | * | 12/2005 | Browne et al. | 296/180.5 |
| 7,669,799 B2 | * | 3/2010 | Elzey et al. | 244/123.12 |
| 7,898,153 B2 | | 3/2011 | Barrett et al. | |
| 2009/0308971 A1 | * | 12/2009 | Shams et al. | 244/46 |
| 2011/0038727 A1 | * | 2/2011 | Vos et al. | 416/1 |
| 2011/0084174 A1 | * | 4/2011 | Hemmelgarn et al. | 244/200 |
| 2013/0309089 A1 | * | 11/2013 | Madsen et al. | 416/1 |

OTHER PUBLICATIONS

"Boeing EnviroBlog" discussion regarding the variable area fan nozzle demonstrator built for the Farnborough Air Show, http://environment.blog.boeing.com/archives/2008/09/pioneer_new_technologies_1.htm (Sep. 23, 2008).
Barrett et al., "Steerable Adaptive Bullet Flight Control Mechanism Design," 53rd AIAA/ASME/ASCE/AHS/ASC Structures, Structural Dynamics and Materials Conference, AIAA 2012-1511, Apr. 23-26, 2012, Honolulu, Hawaii.

* cited by examiner

*Primary Examiner* — Brian M O'Hara
*Assistant Examiner* — Alexander V Giczy
(74) *Attorney, Agent, or Firm* — Mark Pellegrini

(57) ABSTRACT

A system for varying a camber of an airfoil may include an airfoil having an upper surface and a lower surface meeting to form a leading edge and a trailing edge, the lower surface having a first actuator including shape memory alloy sheet, a controller including a plurality of heating elements attached to the shape memory alloy sheet for selectively heating the sheet to a temperature above ambient to deform the upper and lower surfaces to morph a geometry of a camber of the airfoil thereby, a computer control connected to selectively control individual activation of the heating elements to heat the shape memory alloy sheet to a selected temperature to effect a selected deflection, and a cooling device to allow ambient air to enter the wing and exit over the actuator to resume a non-morphed state.

11 Claims, 5 Drawing Sheets

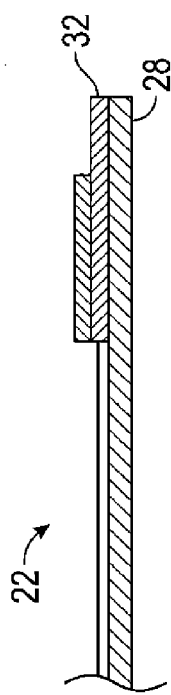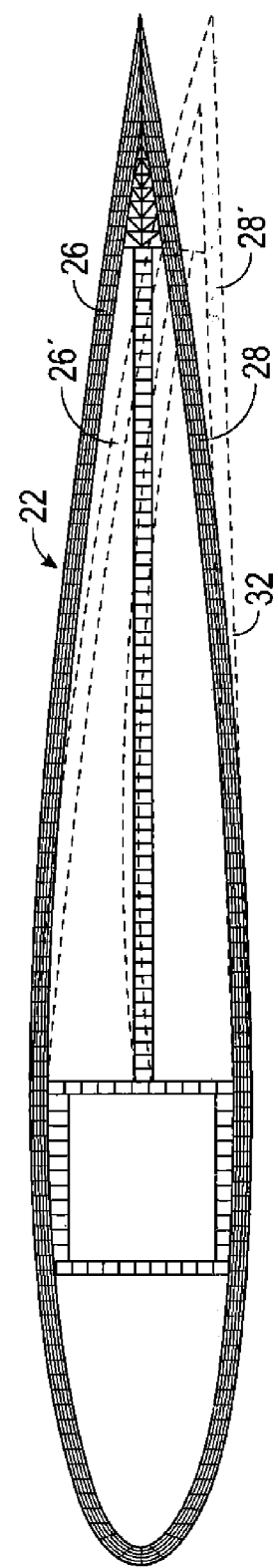
FIG. 4
FIG. 5

VARIABLE CAMBER AIRFOIL SYSTEM

FIELD

The disclosed system and method relate to controlling airfoil structures and, more particularly, to systems and methods for controlling airfoil structures by deforming the surfaces of the airfoil structures.

BACKGROUND

The wings and empennage of aircraft have airfoil shapes. These airfoil shapes, particularly of the wings and horizontal stabilizers, provide lift. Another important function of the wings and horizontal stabilizers is that they include flaps, which are actuated to create flight adjustments, such as climbing, descending, and banking Flaps are also important in effecting stabilization of the aircraft during flight.

It is therefore desirable to provide a system and method for adjusting such control surfaces in flight rapidly. Current technology, which may include the use of hydraulic actuators, has been optimized, but there is still a need for an increase in response time of movement of control surfaces, such as flaps.

SUMMARY

In one embodiment, a system for varying a camber in an airfoil may include an airfoil having an upper surface and a lower surface, the upper and lower surfaces meeting to form a leading edge and a trailing edge, at least one of the upper and lower surfaces including an actuator of shape memory alloy, and a controller for selectively activating the actuator to deform at least one of the upper and lower surfaces to change a geometry of the airfoil thereby.

In another embodiment, a system for changing a shape of a camber of an airfoil may include an airfoil having an upper surface and a lower surface, the upper and lower surfaces meeting to form a leading edge and a trailing edge, at least one of the upper and lower surfaces including an actuator having a shape memory alloy sheet, and a controller for activating the actuator by selectively heating and cooling the shape memory alloy sheet to deform at least one of the upper and lower surfaces to change a geometry of the airfoil thereby.

In yet another embodiment, a method for varying a camber of an airfoil may include providing an airfoil having an upper surface and a lower surface, the upper and lower surfaces meeting to form a leading edge and a trailing edge, with an actuator of shape memory alloy on at least one of the upper and lower surfaces, and selectively activating the actuator to deform at least one of the upper and lower surfaces to change a geometry of the airfoil thereby.

Other objects and advantages of the disclosed method and system will be apparent from the following description, the accompanying drawings and the appended claims.

BRIEF DESCRIPTION OF THE DRAWINGS

FIG. 4 is a schematic, elevational view of the skin of the flap of FIG. 3;

FIG. 5 is a schematic, side elevational view in section of an airfoil having a shape memory alloy sheet in the lower skin;

DETAILED DESCRIPTION

Figure 1:
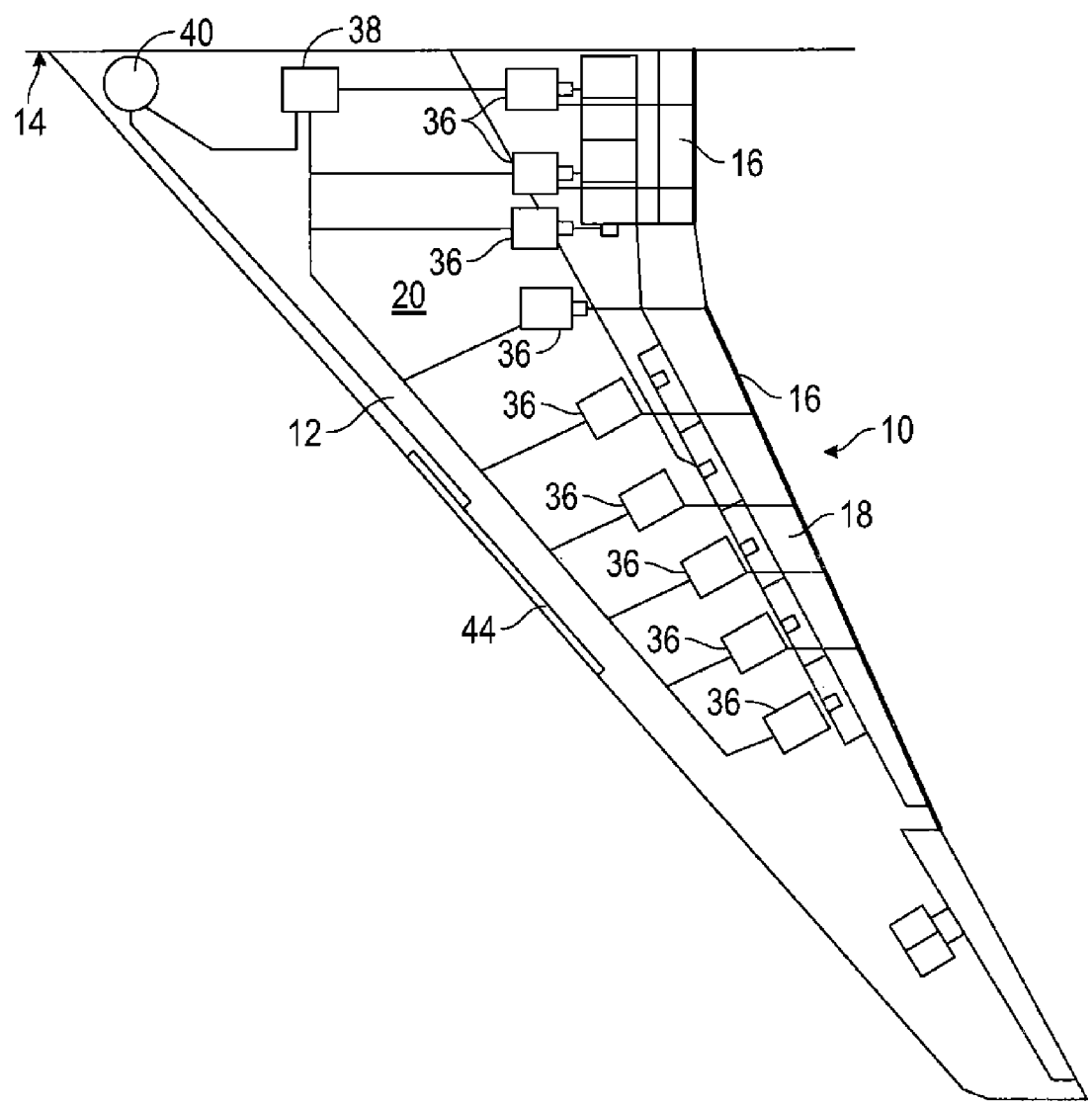
FIG. 1 is a schematic, top plan view of a wing of an aircraft incorporating the disclosed variable camber airfoil system.
Figure 2:
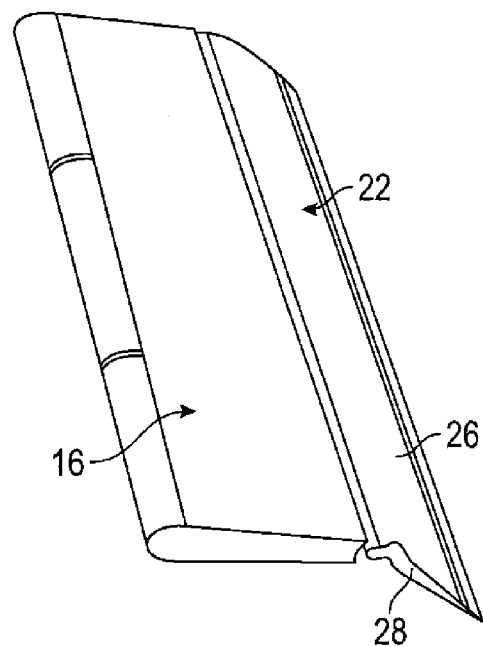
FIG. 2 is a detail of the wing of FIG. 1, showing a trailing edge of a flap.

As shown in FIG. 1, the variable camber airfoil system, generally designated 10, is shown incorporated in the wing 12 of an aircraft 14. The wing 12 may include flaps 16, 18 that are pivotally connected to the main body 20 of the wing. As shown in FIG. 2, flap 16 may have an airfoil shape and include an aft trailing edge section 22. Similarly, as shown in FIG. 1, flap 18 may include a trailing edge component 24 of similar construction to trailing edge 22. Aft trailing edge 22 may include upper and lower skins 26, 28, made of an aircraft aluminum alloy material or carbon fiber material, and formed in an airfoil shape, having a camber. The skins 26, 28 may be attached to ribs 30 (see also FIG. 3).

Figure 3:
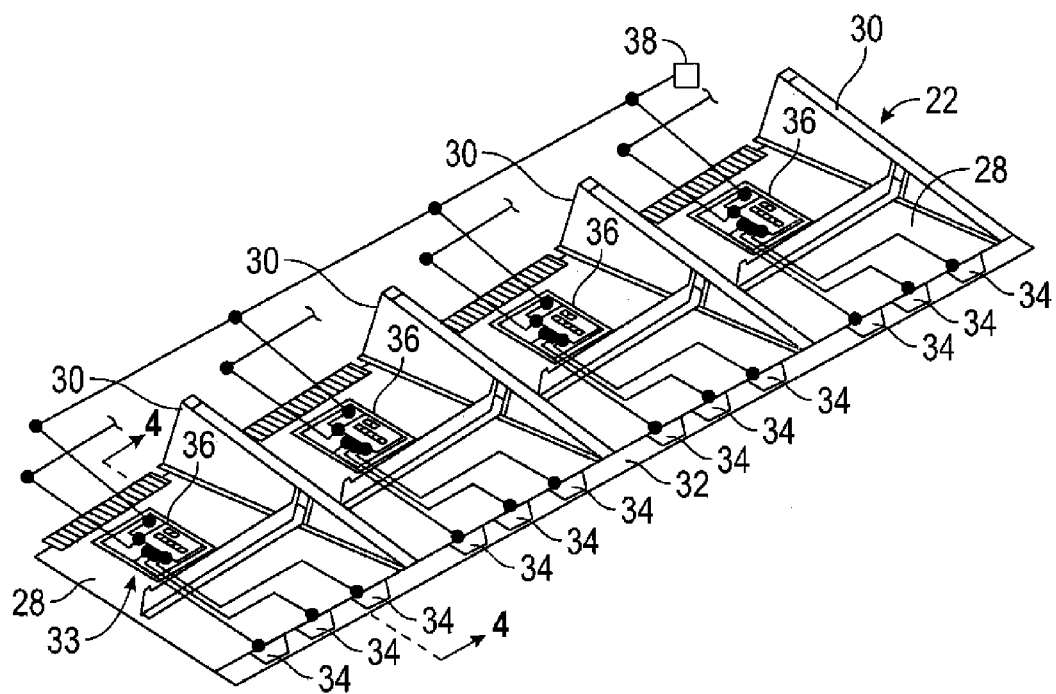
FIG. 3 is a detail of the flap shown in FIG. 2, broken away to show the interior structure of the flap.

As shown in FIGS. 3 and 4, sheets 32 made of shape memory alloy may be attached to the lower skin 28. The sheets 32 of shape memory alloy may be planar in shape (i.e., generally flat and rectangular in shape), and extend substantially the entire length of the lower skin 28 of the aft trailing edge 22. The shape memory alloy (also known as "SMA," smart metal, memory metal, memory alloy, and smart alloy) may be a nickel-titanium alloy or a copper-aluminum-nickel alloy. Additionally, the shape memory alloy may be created by alloying zinc, copper, gold and iron. The sheet 32 of shape memory alloy material may be attached to the lower skin 28 by bonding, such as using appropriate adhesives, or by use of mechanical fasteners.

As shown in FIG. 3, the sheets 32 of shape memory alloy material may be activated by a controller 33 that may take the form of heating elements 34. Heating elements 34 may take the form of resistance heating elements, and alternately, may be induction heating elements or heated blowers. Controller 33 may include power distribution panels 36 connected to a power source 38 (see also FIG. 1) onboard aircraft 14 to activate heating elements 34. Power distribution panels 36 also may include temperature sensors to sense the temperature of the sheets 32. Power source 38 may comprise, or receive electrical power from, an on-board power source (not shown) that derives power from the aircraft engines. A computer control 40 may be connected to the power supply 38 and selectively control individual activation of the heating elements 34 through the power distribution panels 36, and receive sheet 32 temperature data from panels 36. The computer control 40 may be in communication with, and be controlled by, the flight computer of the aircraft 14.

The operation of an embodiment of the system 10 (FIG. 1) is shown in FIG. 5. A trailing edge 22 of flap 16 (FIG. 2) shows the upper surface 26 and lower surface 28 in a normal state or camber. The lower surface 26 may include a sheet 32 of shape memory alloy material, attached as shown in FIGS. 3 and 4. The sheet 32 of shape memory alloy in trailing edge 22 is not actuated. In this state, the shape memory alloy sheet may be at or about ambient temperature. When the computer control 40 activates the power supply 38, the power supply may signal power distribution panels 36 to activate the heating elements 34 attached to the sheets 32 of shape memory alloy. Heating of the smart memory alloy sheets 32 above ambient temperature may cause the panels to deform the geometry of the camber of the airfoil comprising the flap 22. As a result, the contour of upper surface 26 may morph to the contour of upper surface 26', and the contour of lower surface 28 may morph to the contour of lower surface 28' to form trailing edge 22'. This may cause the geometry or camber of the airfoil shape of the trailing edge 22' to change, which may increase lift and drag. This configuration may be appropriate for landing the aircraft 14 (FIG. 1).

When it is desired to return the camber of the trailing edge 22' to its original shape, the computer controller 40 may signal the power source 38 and the power distribution panels 36 to cease supplying electricity to the heating elements 34, which may allow the heating elements to cool and the sheet 32 to cool and resume its non-morphed state. This may change the geometry of the trailing edge 22' to the original shape of trailing edge 22 shown in FIG. 5.

Figure 6:
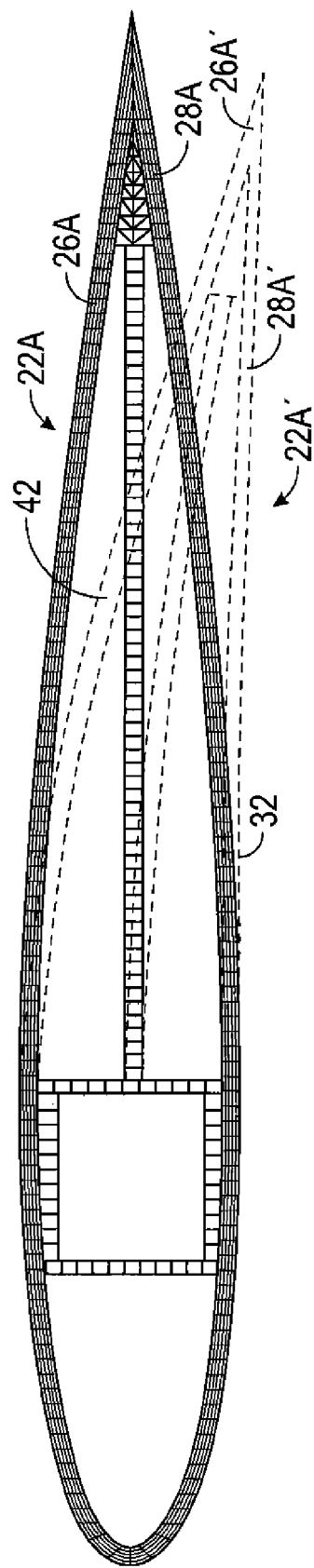
FIG. 6 is a schematic, side elevational view in section of an airfoil having a shape memory alloy in the upper skin and lower skin.

In another embodiment, shown in FIG. 6, a trailing edge 22A may include an upper surface 26A and a lower surface 28A. Upper surface 26A may include a sheet 42, or series of sheets 42, of shape memory alloy material that may extend spanwise along the trailing edge 22A. Similarly, lower surface 28A may include a sheet 32, or a series of sheets 32, of shape memory alloy material that may extend spanwise along the trailing edge 22A. In embodiments, the sheets 32, 42 may be positioned to extend along aft portions of the upper and lower surfaces 26A, 28A, respectively. The sheets 32, 42 of shape memory alloy material may be bonded to the lower surface 26A and upper surface 28A of the trailing edge 22A in the manner shown in FIG. 4. With this embodiment, the adjacent power distribution panels 36 (FIG. 3) may be connected to heating elements 34 attached to both shape memory alloy sheet 32 and shape memory alloy sheet 42 in the manner shown in FIG. 3.

Activation of the shape memory alloy attached panels 42, 32 by the power distribution panels 36 may cause heating of the sheets 32, 42 of shape memory alloy to morph the geometry of the camber of the trailing edge 22A to the shape 22A'. When it is desired to return the camber of the trailing edge 22A' to its original shape 22A, the computer controller 40 may signal the power source 38 and the power distribution panels 36 to cease supplying electricity to the heating elements 34, which may allow the heating elements to cool and the sheets 32 (and sheet 42 of the embodiment of FIG. 6) to cool and resume their non-morphed state. This changes the geometry of the trailing edge 22A' to the original shape 22A shown in FIG. 6.

In embodiments, the heating elements 34 may heat the sheets 32, 42 from an ambient temperature (e.g., about 70° F.) to a temperature of about 300° F. to effect a deflection of 0.3. In other embodiments, the heating elements may heat the sheets 32, 42 from an ambient temperature (e.g., about 70° F.) to a temperature of about 350° F. to effect a deflection of 0.5.

An advantage of the system 10 and method of operation is that, by incorporating sheets 32, 42 of shape memory alloy, the geometry of the camber of the trailing edge 22 may be changed rapidly by heating the sheets of shape memory alloy, and changed back rapidly as the sheets cool. The sheets 32, 42 of shape memory alloy thus function as actuators for adjusting the camber of an airfoil shape.

In an embodiment, the system 10 (FIG. 1) may include a cooling device 44 for lowering a temperature of the shape memory alloy sheets 32, 42. The cooling device 44 may take the form of vents 44 that may be selectively opened to allow ambient air to enter the wing 12 and exit over the shape memory alloy panels 32, 42. The cooling device 44 may be actuated by the computer control 40.

Figure 7:
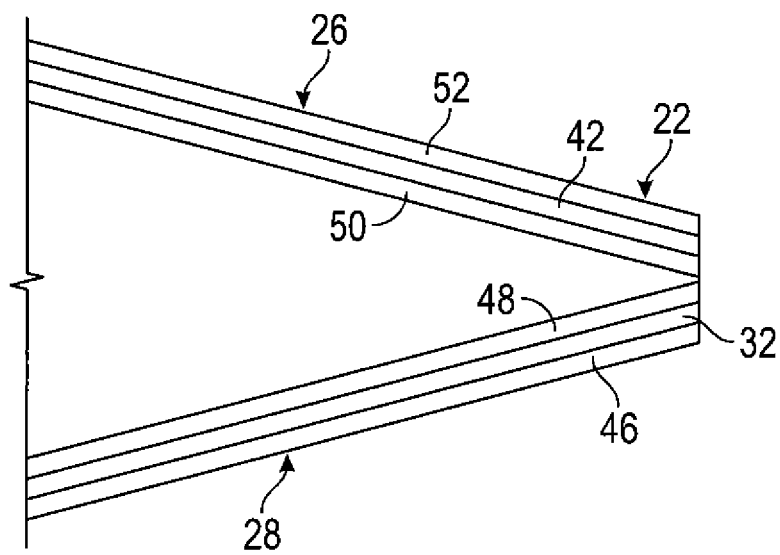
FIG. 7 is a detail of a trailing edge of a flap having a shape memory alloy sheet bonded to non-shape memory alloy material.
Figure 8:
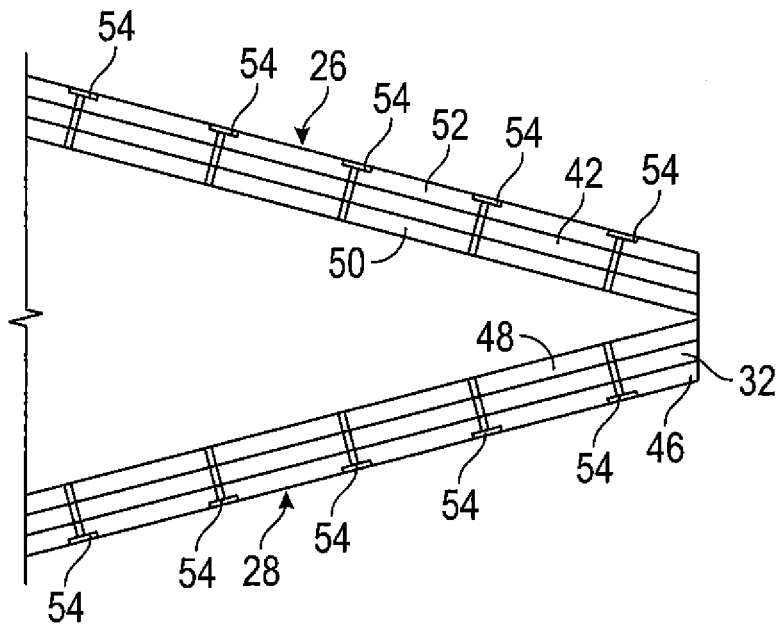
FIG. 8 is a detail of a trailing edge of an airfoil having a shape memory alloy sheet attached to layers of non-shape memory alloy material by fasteners.

In an embodiment shown in FIG. 7, sheet 32 of shape memory alloy material may be sandwiched between layers 46, 48 of non-shape memory alloy material, such as carbon fiber. Similarly sheet 42 of shape memory alloy material may be sandwiched between layers 50, 52 of similar non-shape memory alloy material. The attachment mechanism between layers may be by adhesive bonding. In an alternate embodiment shown in FIG. 8, shape memory alloy sheet 32 may be attached to layers 46, 48 by fasteners 54, and sheet 42 of shape memory alloy material may be attached to layers 50, 52 by fasteners 54. By sandwiching sheets 32 of shape memory alloy between layers 50, 52 of non-shape memory alloy material, the shape memory alloy sheets contribute to the structural strength of the outer skin of the upper surface 26 and lower surface 28.

By placing the shape memory alloy actuators in the form of sheets 32, 42 between non-metal outer layers 46, 48, 50, 52, respectively, the actuator may dynamically shift the elastic axis through the thickness of the shape memory alloy non-metal stack. This may allow the shape memory alloy sheets 32, 42 to contribute integrally to structural stiffness besides acting as actuators. When a compressive load is applied to the stack, the stress-critical adaptive shape memory alloy actuator element (sheets 32, 42) may stay in compression. In an embodiment in which the actuator sheets 32, 42 are bonded to a composite substrate (e.g., FIG. 7), deflection may be increased with increasing axial compressive force levels.

As the shape memory alloy actuator element elongates, as shown with respect to FIGS. 5 and 6, the camber surface of the trailing edges 22, 22A may be driven up and down. In general, using shape memory alloy sheets 32, 42 in combination with non-metal panels may react more quickly, more efficiently and more precisely than other types of camber control surfaces. Morphing the airfoil sectional shape, as shown in FIGS. 5 and 6, along a chord-wise direction by actuating the sheets 32, 42 of shape memory alloy material may improve lift and reduce drag.

In embodiments, the airfoil morphing behavior of the system 10 may be highly effective for improving aerodynamic efficiency at local as well as global applications for the shape of a wing 12. The airfoil profiles shown in FIGS. 5 and 6, in embodiments, may represent an entire wing 12 cross-sectional profile, and/or in other embodiments, a flap 16 profile, which may be morphed as shown in those figures. In each such embodiment, sheets 32, 42 of shape memory alloy may be bonded or otherwise attached (e.g., mechanically by fasteners) to the outer skin of the wing 12 and/or flap 16, and heated by heating elements 34 to morph the geometry of the camber as described herein.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A system for varying a camber of an airfoil of a wing of an aircraft, the system comprising:
   an airfoil having an upper surface and a lower surface, the upper and lower surfaces meeting to form a leading edge and a trailing edge, the upper and lower surfaces each including an outer skin having non-metal outer structural layers;
   at least one of the upper surface and the lower surface having a first actuator including a shape memory alloy sheet embedded and bonded between the non-metal outer structural layers of the at least one of the upper surface and the lower surface;

a controller including a plurality of heating elements attached to the shape memory alloy sheet for selectively heating the shape memory alloy sheet of the first actuator to a temperature above ambient to deform the at least one upper surface and the lower surface having a first actuator along a chord-wise direction to morph a geometry of a camber of the upper surface and the lower surface of the airfoil thereby; and a computer control connected to selectively control individual activation of the plurality of heating elements to heat the shape memory alloy sheet to a selected temperature to effect a selected deflection, and to allow the plurality of heating elements to cool and the shape memory alloy sheet to cool, and the geometry of the camber of the upper surface and the lower surface of the airfoil to resume a non-morphed state;

wherein the controller further includes a cooling device for lowering a temperature of the shape memory alloy sheet of the first actuator, the cooling device including vents in the leading edge that may be selectively opened to allow ambient air to enter the wing and exit over the first actuator.

2. The system of claim 1, wherein the geometry includes a camber of the airfoil of a flap of the aircraft wing.

3. The system of claim 1, wherein the controller includes a power distribution panel to activate the plurality of heating elements for selectively heating the first shape memory alloy actuator.

4. The system of claim 3, wherein the heater is selected from a resistance heater, an induction heater, and a heated blower.

5. The system of claim 3, wherein the power distribution panel includes temperature sensors to sense a temperature of the shape memory alloy sheet; and the computer control receives temperature data of the shape memory alloy sheet from the power distribution panel.

6. The system of claim 1, wherein the first actuator includes a plurality of shape memory alloy sheets.

7. The system of claim 1, wherein the shape memory alloy sheet is attached by at least one of an adhesive bond and a plurality of fasteners to the at least one of the non-metal outer structural layers of the outer skin of the upper surface and the outer skin of the lower surface.

8. The system of claim 1, wherein the shape memory alloy sheet contributes to the structural strength of the at least one of the outer skin of the upper surface and the outer skin of the lower surface.

9. The system of claim 1, wherein the shape memory alloy actuator is located at the trailing edge of the airfoil.

10. The system of claim 9, wherein the shape memory alloy actuator is located on a flap at the trailing edge of the airfoil.

11. A system for changing a shape of a camber of an airfoil of a wing of an aircraft, the system comprising:

an airfoil having an upper surface and a lower surface, the upper and lower surfaces meeting to form a leading edge and a trailing edge, the upper and lower surfaces each including an outer skin having non-metal outer structural layers;

the upper surface including a first actuator having a first shape memory alloy sheet and the lower surface including a second actuator having a second shape memory alloy sheet, the first shape memory alloy sheet embedded and bonded between the non-metal outer structural layers of the upper surface, and the second shape memory alloy sheet embedded and bonded between the non-metal outer structural layers of the lower surface;

a controller including a plurality of heating elements attached to the first shape memory alloy sheet and to the second shape memory alloy sheet for activating the first actuator and the second actuator by selectively heating and cooling the first and second shape memory alloy sheets to deform the upper and lower surfaces in a chord-wise direction to change a geometry of a camber of the upper surface and the lower surface of the airfoil thereby; and a computer control connected to selectively control individual activation of the plurality of heating elements to heat the first and second shape memory alloy sheets to a selected temperature to effect a selected deflection, and to allow the plurality of heating elements to cool the first and the second and the shape memory alloy sheets to cool, and the geometry of the camber of the upper surface and the lower surface of the airfoil to resume a non-morphed state;

wherein the controller further includes a cooling device for lowering a temperature of the first shape memory alloy sheet of the first actuator and a temperature of the second shape memory alloy sheet of the second actuator, the cooling device including vents in the leading edge that may be selectively opened to allow ambient air to enter the wing and exit over the first actuator and the second actuator.

\* \* \* \* \*